United States Patent [19]
Jaffee et al.

[11] Patent Number: 6,089,190
[45] Date of Patent: Jul. 18, 2000

[54] PACKAGING COMPATIBLE ANIMAL LITTER

[75] Inventors: Richard M. Jaffee, Chicago; Daniel S. Jaffee, Evanston; G. Robert Goss, Quincy; Robert Riepl, Crystal Lake, all of Ill.

[73] Assignee: Oil-Dri Corporation of America, Chicago, Ill.

[21] Appl. No.: 09/252,167

[22] Filed: Feb. 18, 1999

[51] Int. Cl.$^7$ .................................. A01K 1/015
[52] U.S. Cl. ........................... 119/173; 119/172
[58] Field of Search .................. 119/172, 173, 119/174; 264/117

[56] References Cited

U.S. PATENT DOCUMENTS

| | | | |
|---|---|---|---|
| 3,980,050 | 9/1976 | Neubauer | 119/172 |
| 4,203,388 | 5/1980 | Cortigene et al. | 119/172 |
| 4,341,180 | 7/1982 | Cortigene et al. | 119/172 |
| 4,374,794 | 2/1983 | Kok | 264/122 |
| 4,532,890 | 8/1985 | Ohki et al. | 119/172 |
| 4,560,527 | 12/1985 | Harke et al. | 264/500 |
| 4,619,862 | 10/1986 | Sokolowski et al. | 428/221 |
| 4,621,011 | 11/1986 | Fleischer et al. | 428/221 |
| 4,638,763 | 1/1987 | Greenberg | 119/172 |
| 4,721,059 | 1/1988 | Lowe et al. | 119/172 |
| 5,000,115 | 3/1991 | Hughes | 119/173 |
| 5,014,650 | 5/1991 | Sowle et al. | 119/171 |
| 5,101,771 | 4/1992 | Goss | 119/173 |
| 5,129,365 | 7/1992 | Hughes | 119/173 |
| 5,146,877 | 9/1992 | Jaffee et al. | 119/172 |
| 5,152,250 | 10/1992 | Loeb | 119/171 |
| 5,229,348 | 7/1993 | Ivie | 502/401 |
| 5,339,769 | 8/1994 | Toth et al. | 119/173 |
| 5,359,961 | 11/1994 | Goss et al. | 119/173 |
| 5,503,111 | 4/1996 | Hughes | 119/173 |
| 5,593,542 | 1/1997 | Wolfer et al. | 192/4 |
| 5,622,600 | 4/1997 | Smith et al. | 162/190 |

FOREIGN PATENT DOCUMENTS

| | | |
|---|---|---|
| 0 378 421 | 7/1990 | European Pat. Off. . |
| 1513292 | 6/1978 | United Kingdom . |

*Primary Examiner*—Peter M. Poon
*Assistant Examiner*—Elizabeth Shaw
*Attorney, Agent, or Firm*—Olson & Hierl, Ltd.

[57] ABSTRACT

A cellulose-based, clumpable animal litter features reduced water activity at cost-effective product moisture levels. The composition includes cellulosic granules and clay particles present in an amount up to 40 weight percent, but sufficient to give the litter composition a packaging-compatible water activity.

16 Claims, 2 Drawing Sheets

PACKAGING COMPATIBLE ANIMAL LITTER

FIELD OF THE INVENTION

This invention relates to animal litters containing granulated cellulosic materials. In particular, the present invention is directed to clumpable animal litters containing cellulose based granules.

BACKGROUND OF THE INVENTION

The use of processed, or granulated, cellulosic materials in animal litter is well known. For example, U.S. Pat. No. 4,374,794 to Kok illustrates a process for generating cellulosic cat litter pellets from fibrous waste sludge of the pulp and paper industries. U.S Pat. No. 4,621,011 to Fleischer et al. also describes a process for making cellulosic granules and indicates their use in cat and other animal litter.

Given the relative abundance of suitable cellulosic source material, including waste paper, cellulosic granules could be a cost-effective alternative to clay granules. In commercial practice however, the use of cellulosic granules in conventional animal litter formulations has been limited because the cellulosic granules do not provide some of the consumer-demanded features provided by clay materials. For example, conventional animal litters made up of substantial portions of cellulosic granules do not agglomerate or clump upon contact with aqueous liquids such as urine with or without conventional clumping agents.

As described in U.S. Pat. No. 5,101,771 to Goss, a clumping feature is highly desirable because it allows separation and removal of urine-soaked litter granules from an otherwise fresh bed of animal litter. Also referred to as scoopable litter because of a sieving scoop used to remove spent granules, such clumpable animal litter spares animal owners the expense and effort of full litter replacement. There continues to be a need for animal litter formulations that provide the urine clumping feature available from clay-based litters.

The use of cellulose-based granules in animal litter also has presented packaging problems because cellulosic granules readily exchange water with the surrounding atmosphere. Stated more precisely, the problem is that cellulosic granules have a relatively high water activity as compared to clay granules typically used in animal litters. Water activity is a measure of how readily product moisture is made available to the surrounding atmosphere.

To prevent spoilage during transport and storage, the humidity of air trapped above and around packaged material must be limited. Excessive package humidity stimulates microbial growth such as molding and also results in localized condensation. While bactericides can be used to limit microbial growth, the condensation problem is more troublesome because it not only damages packaging materials but also causes premature clumping of clumpable animal litters which contain cellulosic granules. Accordingly, clumpable cat litters are necessarily more sensitive to the localized condensation during storage.

One remedy for the excess humidity problem involves drying cellulosic granules to moisture levels below 3 weight percent. Such a thorough drying step adds prohibitively to the cost of producing animal litters, however.

It has now been found that an animal litter which is both packaging compatible and clumpable can be produced without excessive drying by utilizing certain combinations of adhesive-coated cellulosic granules and clay particles.

SUMMARY OF THE INVENTION

A packaging friendly, clumping animal litter composition, in bulk form or packaged, comprises a mixture of discrete cellulosic granules and a particulate clay material such that the mixture exhibits a water activity at 70° Fahrenheit that does not exceed about 0.8 when measured at composition moisture levels up to about 8 weight percent based on the weight of the composition. The cellulosic granules contain at least about 40 weight percent cellulose, the rest is constituted by an inorganic filler such as kaolin or the like. The particulate clay material is present in the litter composition in an amount up to about 40 weight percent based on the weight of the composition.

A scoopable embodiment of the present invention further includes a particulate polymeric clumping agent and a water-soluble adhesive dispersed on the surface of the cellulosic granules. The scoopable litter compositions according to the present invention also exhibit water activities at 70° Fahrenheit that do not exceed about 0.8 when measured at composition moisture levels up to about 8 weight percent based on the weight of the composition. The dispersed adhesive is preferably present in an amount up to about 1 weight percent based on the weight of the composition.

DETAILED DESCRIPTION OF THE PREFERRED EMBODIMENT

Figure 1:
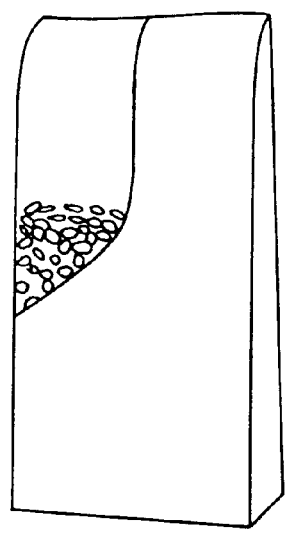
FIG. 1 is an illustration of bagged animal litter according to the present invention.

While the present invention is susceptible to embodiments in many different forms, the preferred embodiments of the invention are described below. It should be understood, however, that the present disclosure is to be considered as an exemplification of the principles of the invention and is not intended to limit the invention to the specific embodiments illustrated.

An animal litter composition according to this invention comprises a mixture of cellulosic granules and clay particles and is characterized as having a water activity of no more than 0.8 when measured at moisture levels up to about 8 weight percent, based on the weight of the composition and at 70° Fahrenheit. Preferred animal litters have water activities at 70° F. that do not exceed about 0.75 for moisture levels up to about 8 weight percent, based on weight of the composition. More preferably the animal litter exhibits a water activity of about 0.7 at 70° F. and at a moisture level of about 7 weight percent.

Water activity of a solid or solution is equal to the water partial pressure of the material divided by the saturation vapor pressure of water at the same temperature:

$$a_w = \frac{p_{H_2O}}{p_0}.$$

The water activity of a given composition can be approximated by measuring the relative humidity of the space surrounding the solid in a closed system at equilibrium (the equilibrium relative humidity or ERH). Water activity measurements indicate the degree to which water is bound to a solid or solution.

The principal constituents of litter compositions that embody the present invention are relatively absorbent cellulosic granules admixed with clay particles. The term "granule," as used herein, refers to any particulate form of matter such as particles, chips, pellets, agglomerates, and the like. The preferred cellulosic granules of the present invention have a mean particle size in the range of about 0.25 to about 1.5 millimeters, and an especially preferred particle size range within about 16 by about 60 mesh, U.S. Sieve Series. For a tabulation of U.S. Sieve Series screen nomenclature, see *Perry's Chemical Engineering Handbook,* 6th Ed., McGraw-Hill, Inc., New York, N.Y. (1984), p. 21–15 (Table 21–6).

The phrase "cellulosic granule," as used herein, means a granule containing at least about 40 weight percent cellulose. The cellulosic granules preferably contain, in addition to cellulose, a mineral filler. Suitable mineral fillers include kaolin, titanium dioxide, calcium carbonate, sodium bicarbonate, and mixtures thereof. Synthetic polymers and the like can also be included as filler. Binders generally known in the art, such as glue and starch, can be added to modify the physical properties of the granules.

Cellulosic granules suitable for the present purposes can be readily prepared using known processing expedients. In particular, numerous methods exist in the art for generating granules from effluent streams of paper making processes. Illustrative are the processes and the resulting granules described in U.S. Pat. No. 4,203,388 to Cortigene et al., U.S. Pat. No. 4,374,794 to Kok, U.S. Pat. No. 4,619,862 to Sokolowski et al. and U.S. Pat No. 4,621,011 to Fleischer et al., U.S. Pat. No. 5,593,542 to Wolfer et al., and U.S. Pat. No. 5,622,600 to Smith et al. Other granulation processes for making cellulosic granules can also be used.

In addition to the traditional waste-paper and tree related sources for cellulosic granules, other materials useful in practicing the present invention include granules derived from various plant sources, such as grains, fruits, cotton, vegetables, nuts, trees, grasses, peat, and the like. Representative cellulosic material sources from fruits include citrus pulp (from lemons, oranges, grape-fruits, etc.), apple pulp, grape pulp, tomato pulp, and the like. Representative cellulosic material sources from cotton include degraded cotton, cotton burns, cottonseed hulls, and the like. Representative cellulosic material sources from vegetables include beet pulp, carrot pulp, and the like. Representative cellulosic material sources from nuts include peanut shells, walnut shells, pecan shells, almond shells, and the like. Representative cellulosic material sources from grasses include alfalfa, hay, straw, and the like.

Clay components suitable for the present purposes have a water activity that is relatively lower than the cellulosic granules. Preferred clay particles have a water activity below 0.6 when measured at 70° Fahrenheit and at 8 weight percent moisture, particularly preferred clays have water activities below 0.5 when measured at these same conditions. The clay components may be present in the animal litter compositions in an amount up to about 40 weight percent based on the weight of the composition. Preferably, the clay is present only in an amount sufficient to give the litter composition a water activity of at most about 0.75 at 70° Fahrenheit and at about 6-weight percent moisture, based on the weight of the composition.

As used herein, the term "clay" has its ordinary meaning, i.e., those materials generally characterized by a mineral structure formed by the arrangement of octahedral units and tetrahedral units or by stacked layers formed by an octahedral sheet and one or more tetrahedral sheets of the atoms that constitute the clay mineral structure. Clays are usually derived from a naturally occurring raw material, but synthetic clays are also suitable.

Illustrative are the two groups of naturally occurring clay minerals. First is the hormite group, defined here as including palygorskite and sepiolite, which have channels formed by octahedral units and tetrahedral units of the clay mineral structure. Second is the smectite group including montmorillonites and saponite, which are constituted by stacked layers formed by an octahedral sheet and one or more tetrahedral sheets, and mixtures of the foregoing. Palygorskite (attapulgite), a mineral found in some clays, is a hydrous silicate material represented by the approximate formula:

$$(OH_2)_4(OH)_2Mg_5Si_8O_{20} \cdot 4H_2O.$$

See, e.g., Grim, R. E., *Clay Mineralogy,* 2nd ed., McGraw-Hill, Inc., New York, N.Y. (1968), p. 115.

Smectite is a generic term that refers to a variety of related minerals also found in some clays. The smectite minerals typically occur only as extremely small particles. Generally, smectite is composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See *Id.,* pp. 77–78. In particular, the smectite family of clays includes the various mineral species montmorillonite, nontronite, hectorite and saponite, all of which can be present in the clay mineral in varying amounts. Smectites are frequently referred to in the trade under designations such as Mississippi Grey, Mississippi Tan, Blue Mountain, and Georgia White.

Other minerals, neither of the smectite genus nor of the hormite variety, that can be present in clay include opal, apatite, calcite, the feldspars, kaolinite, mica, quartz and gypsum, among others.

Clays can also be grouped according to their ability to swell during absorption. It is common for individual clay particles to change in volume to some extent when absorbing an aqueous liquid. Clays generally labelled "non-swelling" only expand so that a fully hydrated clay particle occupies less than about 150% of the volume that the particle occupied in an anhydrous state. In contrast, clays labelled "swellable" are capable of expanding more than 500% during hydration. A swelling clay is defined in the literature and in patents, such as in U.S. Pat. No. 3,586,478, as one which gives a Bingham Yield Value of at least 20 dynes/cm$^2$ at a 2% dispersion in water. An example of a well known swelling clay is sodium bentonite, also called Wyoming bentonite.

Swelling clays are generally preferred for the present invention because they promote clumpability in addition to regulating the water activity of the composition. Non-swelling clays are preferred for formulating "toilet flushable" animal litters, however, because non-swelling clays are less likely to plug pipes and drains.

Of the non-swelling clays, the calcium montmorillonites obtainable from clay mines in Ripley, Miss. are particularly well suited for the present purposes. These clays contain calcium and/or magnesium in the form of exchangeable cations.

The clay constituent of the present compositions is in the form of discrete particles. These particles preferably are rounded in shape to facilitate bagging and handling, and have surfaces that are reasonably smooth to the touch so that an animal feels comfortable standing upon them. Although particle sizes up to about 1 centimeter are suitable, a preferred size of clay particles is in the range of about 4 to about 60 mesh, U.S. Sieve Series. An especially preferred size range for the clay particles in the present invention is the range of about 18 to about 60 mesh.

Figure 2:
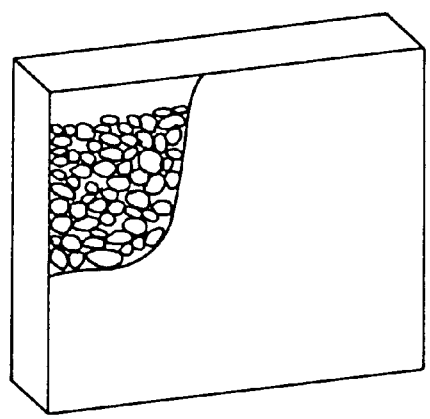
FIG. 2 is an illustration of boxed animal litter according to the present invention.

An alternate embodiment of the present invention is an animal litter in packaged form that comprises a mixture of discrete cellulosic granules containing at least about 40 weight percent cellulose and particulate, clay material and a container surrounding the mixture. The clay granules can be present in an amount up to about 40 weight precent (based on the weight of the mixture). The packaged mixture preferably has a moisture content in the range of about 2 to about 8 weight percent (based on the weight of the mixture) and a water activity at 70° F. that does not exceed about 0.75, and more preferably does not exceed 0.7 at a moisture content in the range of about 4 to about 6 weight percent. Without implying a limitation as to suitable types, container choices include bags, boxes and barrels of various shapes and sizes. FIG. 1 is an illustration of bagged animal litter constituted according to the present invention. FIG. 2 illustrates boxed animal litter constituted according to the present invention.

In an alternate, scoopable (i.e. clumping) embodiment of the present invention, the cellulosic granules discussed above have a water-soluble adhesive dispersed on their surface. Adhesive-bearing cellulosic granules are formed by applying a water-soluble adhesive to the cellulosic granules. Suitable, yet cost-effective cellulosic granules typically have fibrils protruding from the granule surface. To reduce the amount of such fibrils, a water-soluble adhesive is distributed on the cellulosic granules in an amount sufficient to retain normally protruding cellulosic fibrils alongside, i.e. abutting, adjacent to, contiguous with, juxtaposed to, or next to, the granule surface.

Illustrative water-soluble adhesives suitable for present purposes are wheat paste, rice paste, starch, mucilage, and water-soluble vinyl polymers such as polyvinyl acetate. The adhesive present on the cellulosic granules of the present invention is preferably a polysaccharide, and most preferably pregelatinized corn starch or wheat paste. Such materials are commercially available.

A suitable corn starch adhesive is available from Kraus Milling Co., Milwaukee, Wis., under the designation AMERIKOR 818, while suitable polyvinyl acetate is available from The Borden Co., New York, N.Y., under the trade designation "Elmer's Glue-All."

While the water-soluble adhesive may substantially coat the surface of the cellulosic granules, in a preferred embodiment, the water-soluble adhesive is present on the cellulosic granules only to a level sufficient to allow the litter compositions to form strong clumps when contacted with liquids. The required amount of adhesive necessarily varies according to its type as well as the amount of clumping agent present in the litter composition. The water-soluble adhesive can be present in an amount up to about 6 weight percent, preferably no more than about 2 weight percent, based on the weight of the cellulosic granules.

For embodiments where wheat paste serves as the water-soluble adhesive, it is present in an amount preferably in the range of about 0.1 weight percent to about 0.5 weight percent, based on the weight of the cellulosic granules.

For relatively enhanced clumping action, animal litter compositions of the present invention can include a clumping agent. The clumping agent component can be organic or inorganic and is a particulate material, and preferably a polysaccharide gum. When both a water-soluble adhesive and a clumping agent are present, the preferred weight ratio of clumping agent-to-adhesive is in the range from about 5:1 to about 2:1, but can be as high as 10:1 and as low as 1:1. A respective weight ratio of about 2.5:1 is particularly preferred.

An especially preferred polysaccharide clumping agent is a galactomannan gum such as guar gum or locust bean gum. Gums, and galactomannan gums in particular, are well-known materials. See for instance, *Industrial Gums: Polysaccharides & Their Derivatives*, Whistler R. L., BeMiller J. N. (eds.), 3rd Ed. Academic Press (1992) and Davidson, R. L., *Handbook of Water-Soluble Gums & Resins*, McGraw-Hill, Inc., N.Y. (1980).

A galactomannan gum is a carbohydrate polymer containing D-galactose and D-mannose units, or other derivatives of such a polymer. There is a relatively large number of galactomannans, which vary in composition depending on their origin. The galactomannan gum is characterized by a linear structure of β-D-mannopyranosyl units linked (1→4). Single membered α-D-mannopyranosyl units, linked (1→6) with the main chain, are present as side branches. Galactomannan gums include guar gum, which is the pulverized endosperm of the seed of either of two leguminous plants (*Cyamposis tetragonalobus* and *psoraloids*) and locust bean gum, which is found in the endosperm of the seeds of the carob tree (*Ceratonia siliqua*). Carob gum is also a galactomannan gum.

Xanthan gum is yet another example of a suitable polysaccharide.

Non-gum polysaccharides such as cellulose ether can also serve as a clumping agent for the present litter composition. The cellulose ether can be methylcellulose, carboxymethylcellulose, hydroxypropylmethylcellulose, mixtures thereof, and the like. Examples of cellulose ethers that may be used as the clumping agent are the cellulose ether products manufactured by the Dow Chemical Company of Midland, Mich., and commercially available under the designation METHOCEL.

The animal litter of the present invention may also include an inorganic clumping agent such as sodium bentonite in an amount up to 10 weight percent, alone or in combination with an organic clumping agent. When sodium bentonite is utilized as a clumping agent, the preferred form is a relatively fine particulate with a particle size in the range of about 200 to about 325 mesh, U.S. Sieve Series.

For the animal litter of the present invention, the specific particle size and loading level for the clumping agent necessarily varies according to the size and character of the cellulosic granules as well as the type of clumping agent. In general, the clumping agent particles are relatively smaller, i.e. finer, than the cellulosic granules. For specific embodiments employing a guar gum clumping agent and cellulosic granules having a mean particle size in the range from about 0.25 to about 1.5 millimeters, the mean particle size of the guar gum is preferably in the range of about 10 to about 100 microns.

Such a fine particulate guar gum is commercially available under the designation "POLYPRO F11 TF" from Polypro International Co., Minneapolis, Minn. Where guar gum is present with a wheat paste or pregelatinized starch adhesive, the preferred amount of particulate guar gum in the litter composition is in the range from about 1.5 weight percent to about 3 weight percent, based on the total weight of the cellulosic granules.

To form a scoopable animal litter composition according to the present invention, the adhesive-bearing cellulosic granules are combined with clay particles and clumping agent particles to produce a substantially uniform admixture that is free flowing when dry but clumping when wet. The water-soluble adhesive enhances the effect of a clumping agent that is admixed with the adhesive-bearing cellulosic granules when the water-soluble adhesive is activated by wetting as the animal discharges body fluid.

To further reduce the likelihood of microbial growth, the animal litter composition may include a bactericide. Representative bactericides include quaternary ammonia salts, sodium propionate (see U.S. Pat. No. 3,828,731 to White), 1,2-dibromo-2,4-dicyanobutane, sodium borate, and mixtures.

Whether held in the cellulosic granules, the clay particles, or the optional clumping agent, animal litters according to the present invention may contain moisture, but the moisture content is preferably limited to the range of about 3 to about 8 weight percent. Therefore, depending upon the moisture level of the components, a drying step before or after mixing may also be required to set the overall moisture content at suitable levels before packaging. As currently contemplated, a moisture content in the range of about 6.5 to about 7.25 weight percent represents an excellent compromise between shelf life and drying cost.

A process aspect of the present invention provides a packaging compatible animal litter containing cellulosic granules without requiring extensive drying. The process comprises applying the water-soluble adhesive to the cellulosic granules, and then combining the resulting adhesive-bearing granules with clay and clumping agent particles to form a substantially uniform admixture.

As described above, the untreated cellulosic granules normally have surface fibrils protruding away from the granule surface. It has been found that such fibrils interfere with the formation of relatively strong clumps. The water-soluble adhesive is dispersed on the granules in an amount sufficient to substantially reduce the number of these fibrils projecting away from the granule surface and thereby smooth the surface to produce adhesive-bearing granules that are more readily clumpable.

The adhesive is preferably applied to the cellulosic granules in an aqueous vehicle, either as a solution or as an emulsion, depending upon the type of adhesive. The adhesive concentration also may vary but is generally in the range of about 1 to about 40 weight percent adhesive in the solution that is applied. In some instances a $C_1$ to $C_4$ lower aliphatic alcohol may be added to the aqueous vehicle to enhance distribution of the adhesive onto the granules and also to facilitate drying.

Adhesive application can be achieved in a variety of ways. Illustrative methods of application include spraying or sprinkling that is followed by or concurrent with agitation. The preferred method of applying adhesive onto the granules includes spraying an adhesive solution or emulsion over a tumbling bed of cellulosic granules. Both batchwise and continuous processing modes are suitable for this purpose.

The adhesive-bearing granules are combined with the clay particles and the polymeric clumping agent in any order of mixing using various procedures capable of providing a substantially uniform admixture of dry granules and particulates.

After adhesive application but before mixing with the clay and clumping agent materials, the resulting adhesive-bearing granules may be dried as necessary to provide the desired consistency and moisture level. The conventional methods for drying particulate solids are acceptable for this purpose.

The cellulosic granules may also be dedusted before being treated with adhesive. As used herein, the term "dedusted" means that the granules are substantially free from relatively fine, dust-sized particles. The various conventional dry methods for dust separation are acceptable for this purpose. For a discussion of conventional dust separation equipment and methods, see *Perry's Chemical Engineering Handbook*, 6th Ed., McGraw-Hill, Inc., New York, N.Y. (1984), pp. 20–81 to 20–89. A dedusting method that includes passing the cellulosic granules through a fluidized bed is presently favored. Such a fluidized bed type deduster of fluidized bed type is commercially available from Glatt Air Techniques, Inc., Ramsey, N.J., under the designation MODEL WS615. Another suitable continuous mode deduster is commercially available from the Kice Industries, Inc., Wichita, Kans., under the designation "MultiAspirator."

In practice, the dedusting step serves not only to remove undesirable fines but also to either remove or soften the surface fibrils of the cellulosic granules by attrition. The dedusting treatment further enhances the clumpability of the resulting cellulosic litter.

The present invention is useful as litter for household cats, but the scope of the invention is not so limited. The compositions of the present invention provide several key features beneficial for animal litters in general.

One key feature is packaging compatibility at overall moisture levels above suitable limits for cellulosic granules. As demonstrated by spoilage and rotting in closed storage, cellulosic granules generally have a relatively limited ability to retain moisture as compared to clay granules. Conventional methods for producing cellulosic granules involve a wet slurry or pulping step that is eventually followed by a drying step for reducing the moisture level of granules. While granules of lower moisture are generally preferred for storage, the excessive drying required to yield cellulosic granules suitable for packaged storage adds significantly to the cost of producing cellulosic granules.

Figure 3:
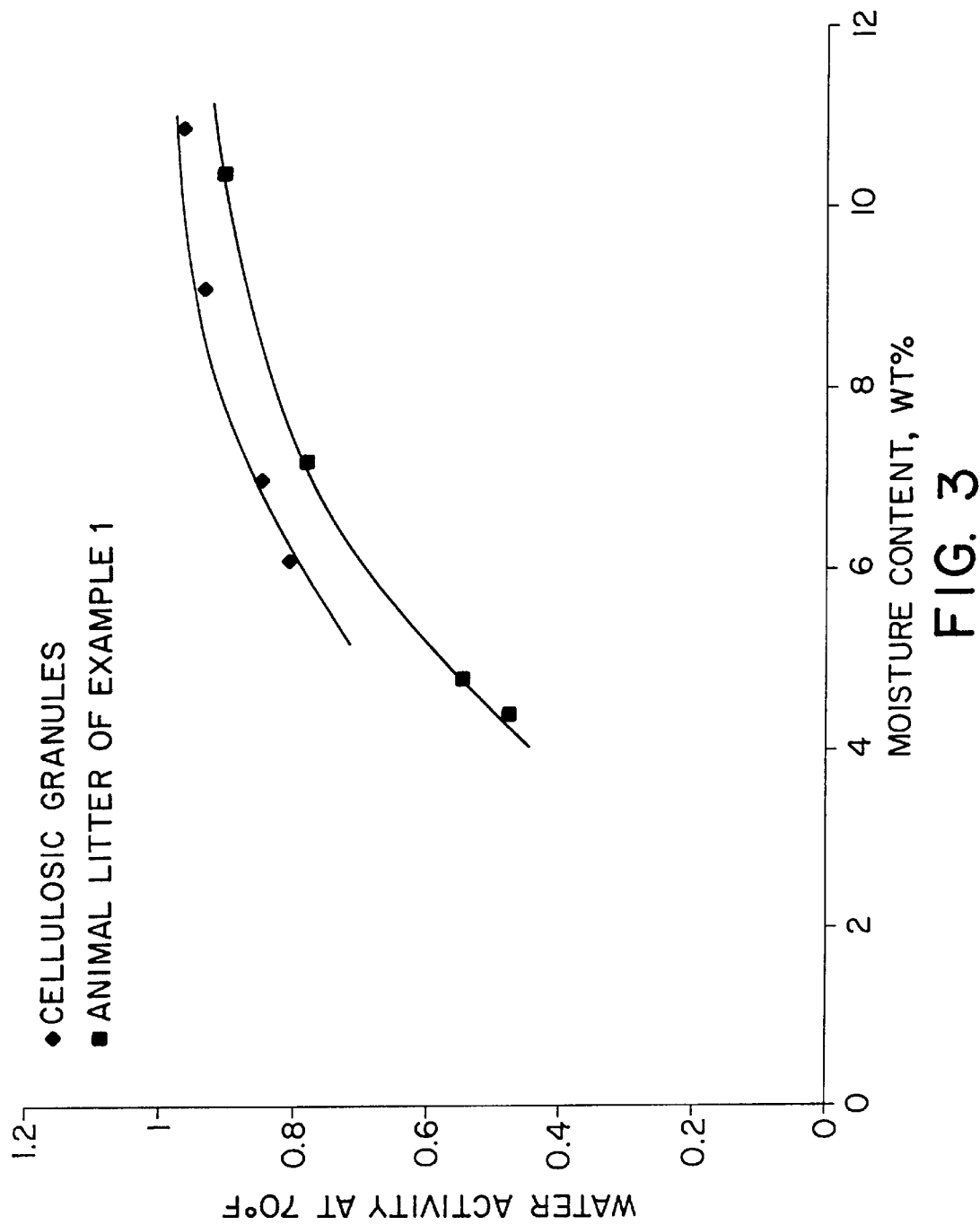
FIG. 3 is a comparison graph showing the water activity at 70° Fahrenheit for both cellulosic granules and a litter composition embodying the present invention measured at various moisture contents.

The animal litter composition of the present invention utilizes cellulosic granules at more cost-effective moisture levels. FIG. 3 demonstrates the packaging compatibility feature graphically. FIG. 3 is a comparison plot showing water activities at various moisture levels for suitable cellulosic granules and a litter composition according to the present invention that contains about 70 weight percent cellulosic granules. According to FIG. 3, animal litter compositions according to the present invention exhibit a water activity that is significantly lower for the same moisture level, thereby decreasing the amount of drying required before packaging.

A second key feature is clumping. Specifically, litter compositions according to the present invention are free flowing when substantially dry but form strong scoopable clumps when contacted with aqueous liquids such as water. The litter generally forms a clump of durable clump strength very quickly, i.e., within about 30 seconds to about one minute, of being wetted with an aqueous liquid, such as water or animal urine. The term "durable clump strength" as used herein means that such a so-formed wetted clump has a firmness of sufficient structural integrity and hardness to withstand mechanical separation from the unwetted litter for disposal substantially immediately, i.e., within about 30 seconds to about one minute of being wetted and retains such firmness for a period of at least 24 hours. Clump strength can be evaluated objectively or subjectively by any number of conventional methods known in the animal litter arts.

The practice of the present invention is demonstrated in the following examples. These examples are meant to illustrate the invention rather than to limit its scope. Variations in the litter compositions which do not adversely affect clumpability and absorption will be evident to one skilled in the art, and are within the scope of this invention. For example, additional ingredients such as coloring agents, and the like may be included in the litter compositions as long as the resulting composition retains desirable properties, as described above.

EXAMPLE 1

Cellulosic Granules With Ripley Mississippi RVM Clay

An embodiment of the present invention was prepared using cellulosic granules containing about 60 weight percent cellulose with a mineral filler, regular volatility matter (RVM; 15 wt-% or less volatile matter) clay mined from Ripley Miss., a starch-based adhesive (AMERIKOR 818), and particulate guar gum. Both the cellulosic granules and the clay particles had an approximate particle size distribution of 16×60 mesh (U.S. Sieve Series). The guar gum particles had a mean size of about 20 microns.

The cellulosic granules were dedusted using a Kice MultiAspirator (Kice Industries, Inc., Wichita, Kans.) and then, while agitated, sprayed with the starch solution specified in TABLE 1, below.

TABLE 1

|  | wt.-% |
|---|---|
| water | 89.3 |
| corn starch (AMERIKOR 818) | 7.0 |
| NaAlg (sodium alginate) | 0.7 |
| T-83 (bactericide) | 3.0 |

The sprayed granules were then dried in a convection oven to a moisture level of about 4.5 weight percent based on the weight of the adhesive-bearing cellulosic granules. Unless noted otherwise, all moisture levels reported herein were measured by weighing samples before and after thorough drying in an oven. The resulting cellulosic granules contained about 0.35 weight percent starch based on the weight of the combined granules and dispersed starch.

The clay particles were then combined with the cellulosic granules by mixing. Before mixing, the clay particles had a moisture content of about 5.4 weight percent moisture, based on the weight of the clay particles. Next, the guar gum clumping agent was added to and mixed with the claycellulosic granules mixture. The obtained animal litter had the following composition:

TABLE 2

|  | wt. % |
|---|---|
| starch-bearing cellulosic granules: | 68.6 |
| clay particles | 29.4 |
| guar gum | 2 |

A sample of the litter composition was tested for overall moisture and found to contain about 4.9 weight percent water based on the weight of the composition.

Evaluation of the litter composition with an aliquot of aqueous liquid revealed that the litter readily forms clumps of durable clump strength in less than 30 seconds. Furthermore, the produced clumps maintained structural integrity for a time period in excess of one hour.

Samples were also drawn and tested for water activity at various moisture levels. Test samples of about 1,000 grams were sealed within household freezer bags. Sample moisture levels were varied by misting water over the samples prior to addition of guar gum. The enclosed samples were allowed to equilibrate at approximately 70° Fahrenheit (68° F. to 73° F.) for at least one day. Next, the water activity of each sample was estimated by measuring the relative humidity in the sealed bags using a Fisher thin film, probe-style capacitance hygrometer. The results are presented in TABLE 3, below, and in FIG. 3.

EXAMPLE 2

Water Activity Comparison

To further assess the relative effectiveness of embodiments prepared according to the present invention, samples of the cellulosic granules used in Example 1 were drawn for water activity testing before applying starch. The water activity was measured at 70° Fahrenheit temperature for the cellulosic granules at various moisture levels. Water activity was detected using the same techniques described for Example 1. The results are listed in TABLE 3, below, and in FIG. 3.

TABLE 3

|  | Water Activity | |
|---|---|---|
| Moisture Level (wt-%) | Cellulosic Granules | Example 1 |
| 4.4 | — | 0.478 |
| 4.8 | — | 0.547 |
| 6.1 | 0.809 | — |
| 7 | 0.852 | — |
| 7.2 | — | 0.784 |
| 9.1 | 0.938 | — |
| 10.4 | — | 0.908 |
| 10.9 | 0.971 | — |

These data demonstrate that animal litters according to the present invention have substantially reduced water activities, and therefore considerably greater storage compatibility, than the cellulosic granules acting alone.

The foregoing specification is intended as illustrative and is not to be taken as limiting. Still other variations within the spirit and the scope of the invention are possible and will readily present themselves to those skilled in the art.

What is claimed is:

1. A clumping animal litter composition comprising a mixture of:

discrete cellulosic granules containing at least about 40 weight percent cellulose, said cellulosic granules having a water-soluble adhesive dispersed on the surface of said cellulosic granules;

a particulate clay material having a water activity of at most about 0.6 measured at 70° Fahrenheit and 6 weight percent moisture, based on the weight of the clay material, said clay material being present in an amount sufficient to give said composition a water activity of no more than about 0.8 measured at 70° Fahrenheit and 8 weight percent moisture, based on the weight of the composition; and a particulate polymeric clumping agent which is a gum selected from the group consisting of guar gum, locust bean gum, xanthan gum, ether derivatives thereof, and mixtures thereof, present in the composition in an amount up to about 5 weight percent based on the weight of the composition.

2. The animal litter of claim 1 having a moisture content in the range of about 3 to about 8 weight percent.

3. The litter composition of claim 1 wherein said clay material is a swelling clay.

4. The litter composition of claim 1 wherein said adhesive is a member of the group consisting of a polysaccharide gum, wheat paste, rice paste, starch, mucilage, a water-soluble vinyl polymer, and mixtures thereof.

5. The litter composition of claim 1 wherein the surface of said cellulosic granules is substantially coated with said adhesive.

6. The litter composition of claim 1 wherein said adhesive is present in an amount up to about 1 weight percent, based on the weight of the composition.

7. The litter composition of claim 1 wherein the clumping agent-to-adhesive weight ratio is in the range of about 10 to 1 to about 1 to 1.

8. A clumping animal litter composition comprising a mixture of:
   discrete cellulosic granules containing at least about 40 weight percent cellulose, said cellulosic granules having a water-soluble adhesive dispersed on the surface of said cellulosic granules;
   a particulate clay material having a water activity of at most about 0.6 measured at 70° Fahrenheit and 6 weight percent moisture, based on the weight of the clay material, said clay material being present in an amount sufficient to give said composition a water activity of no more than about 0.8 measured at 70° Fahrenheit and 8 weight percent moisture, based on the weight of the composition; and
   a particulate polymeric clumping agent present in the composition in an amount up to about 5 weight percent based on the weight of the composition; said clumping agent being a galactomannan gum.

9. The litter composition of claim 8 wherein said clumping agent is a guar gum.

10. The litter composition of claim 8 further including an inorganic clumping agent present in an amount up to about 10 weight percent, based on the weight of the composition.

11. The litter composition of claim 10 wherein the inorganic clumping agent is particulate sodium bentonite having a particle size in the range of about 200 mesh to about 325 mesh, U.S. Sieve Series.

12. An animal litter in packaged form comprising:
   a mixture of discrete cellulosic granules containing at least about 40 weight percent cellulose, a particulate, clay material having a water activity of at most about 0.6 measured at 70° Fahrenheit and 6 weight percent moisture, based on the weight of the clay material, said clay material being present in an amount sufficient to give said composition a water activity of no more than about 0.8 measured at 70° Fahrenheit and 8 weight percent moisture, based on the weight of the composition; and
   a particulate galactomannan gum present in the composition in an amount up to about 5 weight percent based on the weight of the composition present in an amount up to about 40 weight percent based on the weight of the mixture; and
   a container enveloping said mixture;
   said mixture having a moisture content in the range of about 2 to about 8 weight percent, based on the weight of the mixture and a water activity at 70° Fahrenheit that does not exceed about 0.75.

13. The animal litter of claim 12 wherein said composition has a moisture content in the range of about 4 to about 6 weight percent based on the weight of the composition, and a water activity at 70° Fahrenheit that does not exceed about 0.7.

14. The animal litter of claim 12 further including a bactericide.

15. The animal litter of claim 12 wherein said container is a bag.

16. The animal litter of claim 12 wherein said container is a box.

* * * * *